United States Patent [19]

Matsumoto

[11] 4,053,819
[45] Oct. 11, 1977

[54] NUMERICAL CONTROL SYSTEM FOR LATHES

[75] Inventor: Mitsuo Matsumoto, Kokubunji, Japan

[73] Assignee: Tokyo Shibaura Electric Co., Ltd., Tokyo, Japan

[21] Appl. No.: 672,440

[22] Filed: Mar. 31, 1976

[30] Foreign Application Priority Data

Oct. 15, 1975 Japan .................................. 50-123233

[51] Int. Cl.² ........................................... G05B 19/18
[52] U.S. Cl. ..................... 318/636; 318/573; 318/569
[58] Field of Search ................. 235/151.11; 318/636, 318/573

[56] References Cited

U.S. PATENT DOCUMENTS

| 3,612,841 | 10/1971 | Kosem et al. | 235/151.11 |
| 3,864,557 | 2/1975 | Sindelar | 235/151.11 |
| 3,864,613 | 2/1975 | Cutler | 235/151.11 X |

Primary Examiner—Eugene G. Botz
Attorney, Agent, or Firm—Finnegan, Henderson, Farabow & Garrett

[57] ABSTRACT

A numerical control system for lathes includes a controller adapted to calculate a tool moving amount based on data from a tool moving mode-punched tape as read by a tape reader for each sampling time $\Delta t$ when a pulse is generated from a sampling pulse generator and on spindle rotation position data detected by a spindle position detector, and executes a tool action instruction mode including a feed per minute instruction mode, feed per spindle revolution instruction mode and thread cutting instruction mode by operating a tool through a servo system in accordance with the tool action mode.

9 Claims, 10 Drawing Figures

NUMERICAL CONTROL SYSTEM FOR LATHES

BACKGROUND OF THE INVENTION

This invention relates to a numerical control system and in particular a numerical control system for lathes which executes a feed per minute instruction mode, feed per revolution instruction mode and a thread cutting feed instruction mode.

Circuits known as digital differential analyzers (DDA) or pulse multipliers are used, in plural numbers, for arithmetic calculation circuits in a numerical control system (hereinafter referred to as an NC system) for lathes. The DDA is adapted to deliver a relatively equidistant pulse train signal of, for example, $f_0 = (M/2^{24}) \times f_1$ when it receives a pulse train signal with a frequency $f_1$ at its pulse input terminal and a data amount M at its data input terminal ($2^{24}$ is a value when a register of the DDA constitutes a binary 24-bit configuration). In presently available NC systems require a feed speed of 10,000,000 (pulse/min) and a minimum pulse division capability of 1 ($\mu$m/pulse) is required as a minimum input pulse unit to a servo system. In order to meet with these requirements the DDA must deliver an output pulse having a pulse frequency $f_0$ with a maximum value of 10,000,000 (pulse/min) = 166,666 (pulse/sec). This means that an output pulse must be delivered at a speed of (1/166,666) = 6 ($\mu$s).

It is, however, impossible for the NC system, after the NC system receives an instruction, to execute the instruction in a time of 6 $\mu$s, since the required time is very small. Even when the DDA effects a calculation using a high speed computer, at least more than 20 steps are required for effecting one DDA calculation. Since a time of 6 ($\mu$s)/20 (steps) = 0.3 ($\mu$s/step) is allotted to one step instruction, an arithmetic calculation of the DDA can not be made using the high speed computer. Furthermore, a clock oscillator must deliver a very high frequency of $2^{48}$(pulse/min) $\approx 10^{12}$(pulse/sec) i.e., more than $10^6$ (MHz). As an arithmetic logic circuit requires such a rapid clock pulse rate from the logical standpoint, it is not possible to realize such a circuit arrangement using now available logic circuits.

In a thread cutting mode, with $f_0$ (pulse/rev) representing a pulse rate from a spindle pulse generator, the DDA can not deliver a pulse with a pulse rate of $f_0$ (pulse/rev). In consequence, the conventional NC system can not cut a thread with a pitch of more than $f_0$ ($\mu$m/rev). When a thread with a larger pitch is to be cut, it is necessary to increase a pulse generating rate from the spindle pulse generator. The pulse generator with such a high pulse dividing capability is high in cost and, when the spindle is rotated at high speed, problem is presented, due to a high output frequency of the pulse generator, with respect to a connection to the pulse generator frequency characteristics and so on. This presents problems from a practical viewpoint.

SUMMARY OF THE INVENTION

It is accordingly an object of this invention to provide an NC system capable of adequately making a calculating process using a now available computer and capable of cutting a thread of a larger pitch, irrespective of a pulse division capability from a spindle pulse generator, without requiring any high speed logic circuit.

In one aspect of this invention an NC system for lathes comprises a numerical data source for delivering as numerical data a tool action instruction mode including a feed per minute instruction mode, feed per spindle revolution mode and thread cutting instruction mode; a sampling pulse generator for generating a sampling pulse for each predetermined time $\Delta t$; a spindle position detector mechanically mounted on a spindle of the lathe, dividing one revolution of the spindle and delivering an output corresponding to the divided position in a cyclic function from a spindle reference position; a controller for calculating instruction position increment values corresponding to a tool moving amount for each predetermined time $\Delta t$; and a position error circuit for taking out a difference between a cumulative value of the tool moving amount for each predetermined time $\Delta t$ and an output value from the spindle position detector for detecting an absolute position of a machine movable section equipped with a tool, in which in the feed per minute instruction mode, instruction position increment values for each predetermined time $\Delta t$ are calculated based on the numerical data, in the feed per spindle revolution instruction mode, instruction position increment values for each predetermined time $\Delta t$ are calculated based on the numerical data of the numerical data source and spindle revolution amount detected for each predetermined time $\Delta t$ at the spindle position detector, and in a thread cutting instruction mode instruction position increment values for each predetermined time $\Delta t$ are calculated based on the numerical value from the numerical data source and spindle revolution position data from a spindle reference position detected for each predetermined time $\Delta t$ at the spindle position detector, the instruction position increment values being transmitted to the machine movable section through the position error circuit and a servo system including a digital to analog converter, amplifier, servo motor etc., thereby cutting a workpiece according to each mode.

In another aspect of this invention a sampling pulse generator for the NC system is adapted to generate a pulse for each sampling time 10 ms. Since a servo motor is controlled for each sampling time, the NC system can obtain the same servo characteristic as in the case of a continuous control, with respect to a most rapid response servo motor now available in the art, and an adequate arithmetic calculating process time can be obtained, for it is sufficient that instruction position increment values are calculated only once during the sampling time.

In another aspect of this invention, even during a final sampling time when a comulative value of instruction position increment values exceeds a value corresponding to a tool moving distance, a cutting can be effected according to a predetermined tool moving distance due to the presence of a corresponding process circuit.

In another aspect of this invention, in a thread cutting instruction mode a thread with a predetermined pitch can be cut, irrespective of the number of divisions on the spindle corresponding to one spindle revolution, due to the provision of a circuit made in synchronism with a spindle reference position.

In another aspect of this invention, various calculating modes can be executed using a computer and a program for effecting a calculation of instruction position increment values corresponding to a tool moving amount for each sampling time $\Delta t$ as well as taking out a difference value between a cumulative value of instruction position increment values calculated for each predetermined time $\Delta t$ and a value corresponding to an absolute position of the machine movable section.

The other objects and advantages will be understood when the description proceeds.

BRIEF DESCRIPTION OF THE DRAWING

This invention will be further described by way of example by referring to the accompanying drawings in which.

DETAILED DESCRIPTION OF THE PREFERRED EMBODIMENTS

Figure 1:
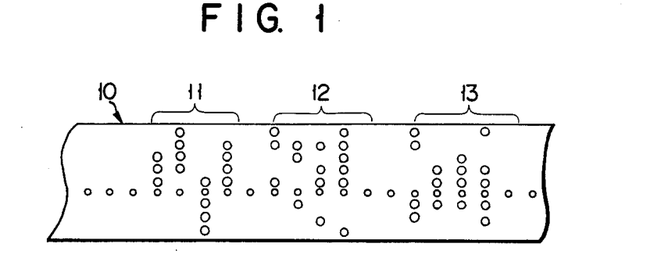
FIG. 1 shows an NC tape used in this invention.

An NC (numerical control) system according to this invention executes three instruction modes. FIG. 1 shows an NC tape 10 in which the three instruction modes are punched, as a numerical code data, for each block. In FIG. 1 reference numeral 11 shows a feed per minute instruction mode; 12, a feed per spindle revolution instruction mode; and 13, a thread-cutting instruction mode. The feed per minute instruction mode 11 represents in an amount of movement per minute ($\mu$m/min) a feed speed F of a machine movable section for moving a tool relative to a workpiece mounted on a spindle (the unit distance $\mu$m equals $10^{-6}$ meters). The feed per minute instruction mode is used for numerical control of a milling machine etc. The feed per revolution mode 12 represents in an amount of movement per revolution ($\mu$m/rev) a feed speed F of the machine movable section, and the thread-cutting instruction mode 13 is an instruction for cutting a thread with a F ($\mu$m/rev) pitch, i.e. an instruction characteristic of a lathe.

Figure 2:
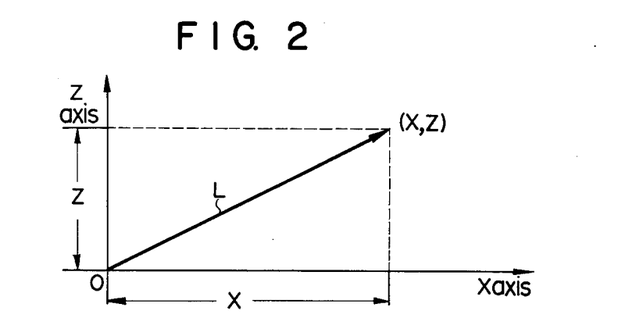
FIG. 2 is a graph for explaining a moving path or cutting path of a tool in a lathe.

With an X-axis moving distance represented by X ($\mu$m) and Z-axis moving distance by Z ($\mu$m) in an ordinate as shown in FIG. 2, the following codes are required to execute the abovementioned three instruction modes: an "X, Z" code for moving the tool-mounted machine movable section on a straight line L passing through the origin (O, O) and point (X, Z) of the coordinate in FIG. 2; a feed speed instruction code "F" representing at what speed the machine movable section is moved on the straight line L; and a prepare function instruction code "G" for executing these instruction modes. These codes are punched for each block in the NC tape 10 (in FIG. 1) according to the above-mentioned instruction modes. That is, for the feed per minute instruction mode 11 the moving distance X ($\mu$m)·Z($\mu$m) code, feed speed F ($\mu$m/min) code and prepare function G94 code are punched in one block; for the feed per revolution mode 12 the moving distance X ($\mu$m), Z ($\mu$m) code, feed speed F ($\mu$m/rev) and pre- pare function G95 code are punched in one block; and for the thread-cutting mode 13 the moving distance X ($\mu$m), Z ($\mu$m), pitch F ($\mu$m/rev) code and prepare function G33 code are punched in one block.

Figure 3:
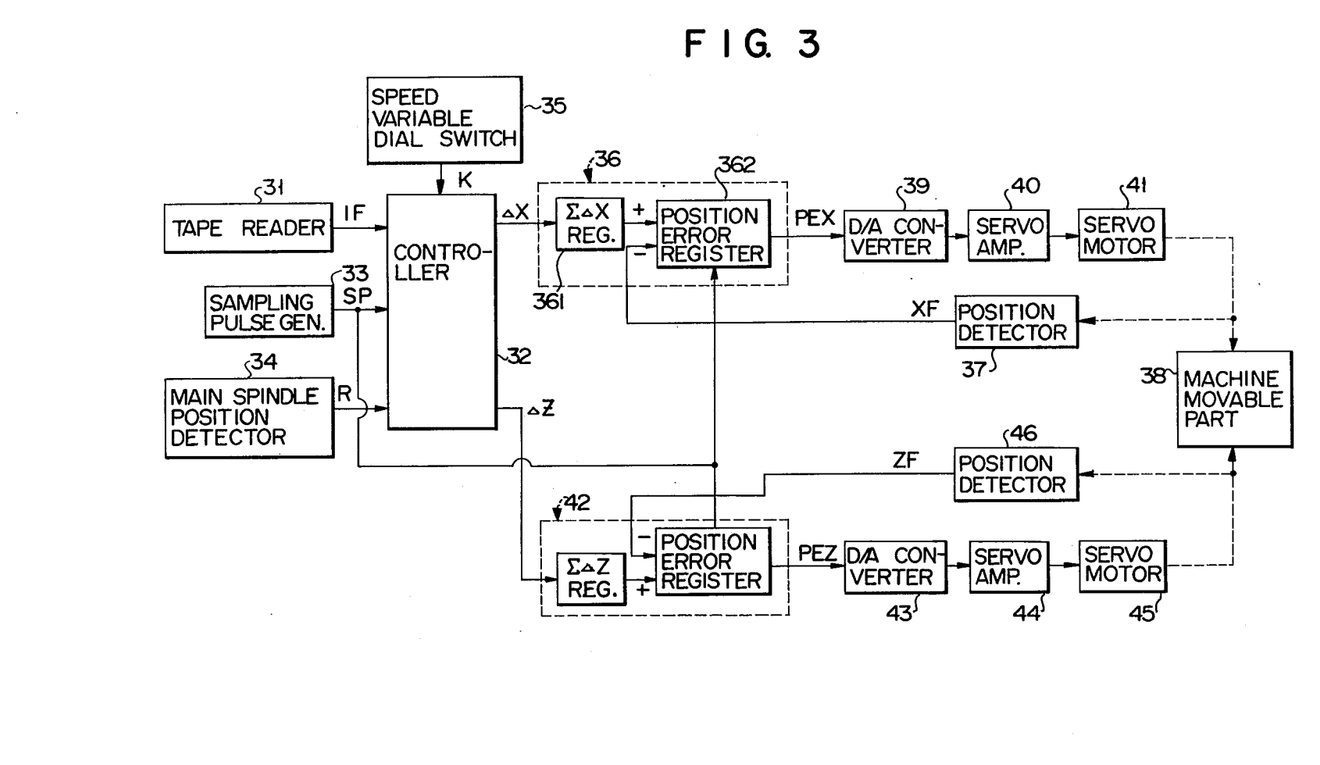
FIG. 3 is a block diagram showing an NC system according to one embodiment of this invention.

FIG. 3 is a block diagram showing an NC system according to this invention. A tape reader 31 supplies from the NC tape 10 in FIG. 1 to a controller 32 a data IF for instructing a cutting path of a lathe, and a sampling pulse generator 33 applies to the controller 32 a repetition pulse, i.e., a sampling pulse signal SP, which is generated at a cycle of 10 ms. A spindle position data signal R generated by a spindle position detector is applied to the controller 32, the spindle position detector comprising a position encoder for providing in a digital amount an output corresponding to the absolute position of a spindle rotatively moved from a reference position with one revolution of the spindle being divided, for example, into a few thousand parts. A feed speed variable dial switch 35 of a manually operated type is adapted to vary a feed speed indicated by the feed instruction code F in the NC tape 10, and an output signal K of the feed speed variable dial switch 35 is coupled to the controller 32. The controller 32 is adapted to calculate for every sampling pulse time $\Delta t$ (which in the present embodiment is equal to 10 ms.) a moving instruction position, on the X- and Z-axes of a coordinate in FIG. 4, to which the machine movable section is moved based on the above-mentioned four parameters, i.e., the data IF, sampling pulse signal SP, spindle position information and signal K, and then deliver increment $\Delta X$ and $\Delta Z$ output signals.

Figure 4:
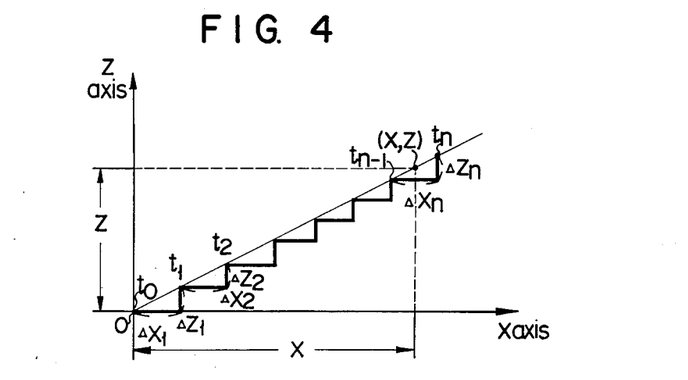
FIG. 4 is a graph for explaining a relation between a sampling time and instrument position increment values in an instruction mode according to this invention.

When, for example, the machine movable section is moved on a straight line passing through the origin (O, O) and a point (X, Z) in FIG. 4 where X is an X-axis moving distance and Z is a Z axis moving distance, the controller 32 calculates increment values $\Delta X = \Delta X_1$ and $\Delta Z = \Delta Z_1$ corresponding to the instruction position, on the X- and Z-axes of the coordinate, to which the machine movable section is to be moved during a sampling interval ($t_0$ to $t_1$) of $\Delta t = 10$ ms. Likewise, the controller 32 calculates increment values $\Delta X = \Delta X_2$ and $\Delta Z = \Delta Z_2$ corresponding to the instruction position, on the X- and Z-axes of the coordinate, to which the machine movable section is to be moved during a second sampling interval ($t_1$ to $t_2$) of 10 ms. In this way, the controller 32 calculates the increment values $\Delta X$ and $\Delta Z$ corresponding to the instruction position taken by the machine movable section during each sampling time $\Delta t$. The increment $\Delta X$ and $\Delta Z$ output signals of the controller 32 are applied to position error circuits 36 and 42 constituting part of X- and Z-axis servo systems respectively. The position error circuits 36 and 42 are similar in arrangement to each other and only one position error circuit 36 will be explained below.

The position error circuits 36 comprise an instruction position cumulating register 361 and a position error register 362. The instruction position cumulating register 361 is adapted to cumulatively add position instruction increments $\Delta X$ calculated at the controller during each sampling time $\Delta t$ and to generate a command signal representing the desired position of the machine movable section. The content of the instruction position cumulating register 361 represents the instruction position for the X-axis during each sampling time period since it registers $\Delta X_1$ at time $t_1$, $\Delta X_1 + \Delta X_2$ at time $t_2$ . . .

The output signal of the register 361 is applied to an "add" input terminal of a position error register 362 which constitutes an "add/subtract" register and an output signal XF of a position detector 37 is applied to a "subtract" input terminal of the position error register 362. The position detector 37 is a position encoder for delivering a digital value representing the actual absolute position of the tool-mounted machine movable section, and the position error register 362 is adapted to subtract the content of the position detector from the content of the register 361, each time it receives a sampling pulse SP, and store a difference value between them. An output signal, i.e., a position error signal, PEX of the register 362 shows a position error, i.e., a difference between the instructed position corresponding to each sampling time $\Delta t$ and the actual position of the machine movable section. The position error signal PEX is renewed for each sampling time $\Delta t$. Since, however, the sampling time involved is very short (10 ms), the same control characteristic as in a continuous control can be attained with respect to the servo system. As the most rapid servo-motor response frequency now available in the art is on the order of about 100 Hz, if the servo motor is controlled at a sampling time of below 10 ms (i.e. a sampling control frequency of above 100 Hz), the same servo characteristic as in a continuous control can be obtained.

The digital output signal PEX is converted at a D-A (digital to analog) converter 39 into an analog signal which in turn is applied to a servo amplifier 40 where it is amplified to a signal necessary for driving a servo motor. The output signal of the servo amplifier 40 drives a servo motor 41 corresponding to the X-axis, causing a machine movable section mechanically coupled to the servo motor 41 to be moved.

The machine movable section 38 is so position-controlled that the position error between the instruction position signal for the X-axis moving member of the machine movable section 38 and the signal XF corresponding to the absolute position of the movable section 38 as detected by the position detector 37 becomes zero. As a result, the movable section 38 is moved according to the instruction position of each instruction mode.

The Z-axis servo motor system, like the X-axis servo system, consists of a circuit arrangement including a digital to analog converter 43, servo amplifier 44, servo motor 45 and position detector 46. The Z-axis servo motor system is similar in operation to the X-axis servo motor system and any further explanation thereof is omitted.

The position detector 37 can use, instead of the above-mentioned position encoder, a position detecting means adapted to reduce the actual position of the machine movable section to increment values corresponding to the detected position taken during the sampling time $\Delta t$. This means uses a direction discriminable pulse generating type position detector by which a distance actually taken by the machine movable section during the sampling time $\Delta t$ is counted by a reversible counter. When such a position is detected, the position error circuit 36 performs the following operation. If each difference value between a position increment value $\Delta X$ outputted from the controller 32 upon receipt of each sampling pulse SP and a position increment value detected from the position detector for each sampling time $\Delta t$ are cumulatively additively applied to a position error detector representing a content corresponding to the above-mentioned position error PEX, the content of the position error register would represent a cumulative position error. In this case, the cumulative position error PEX must be applied to the digital to analog converter 39.

Figure 6A:
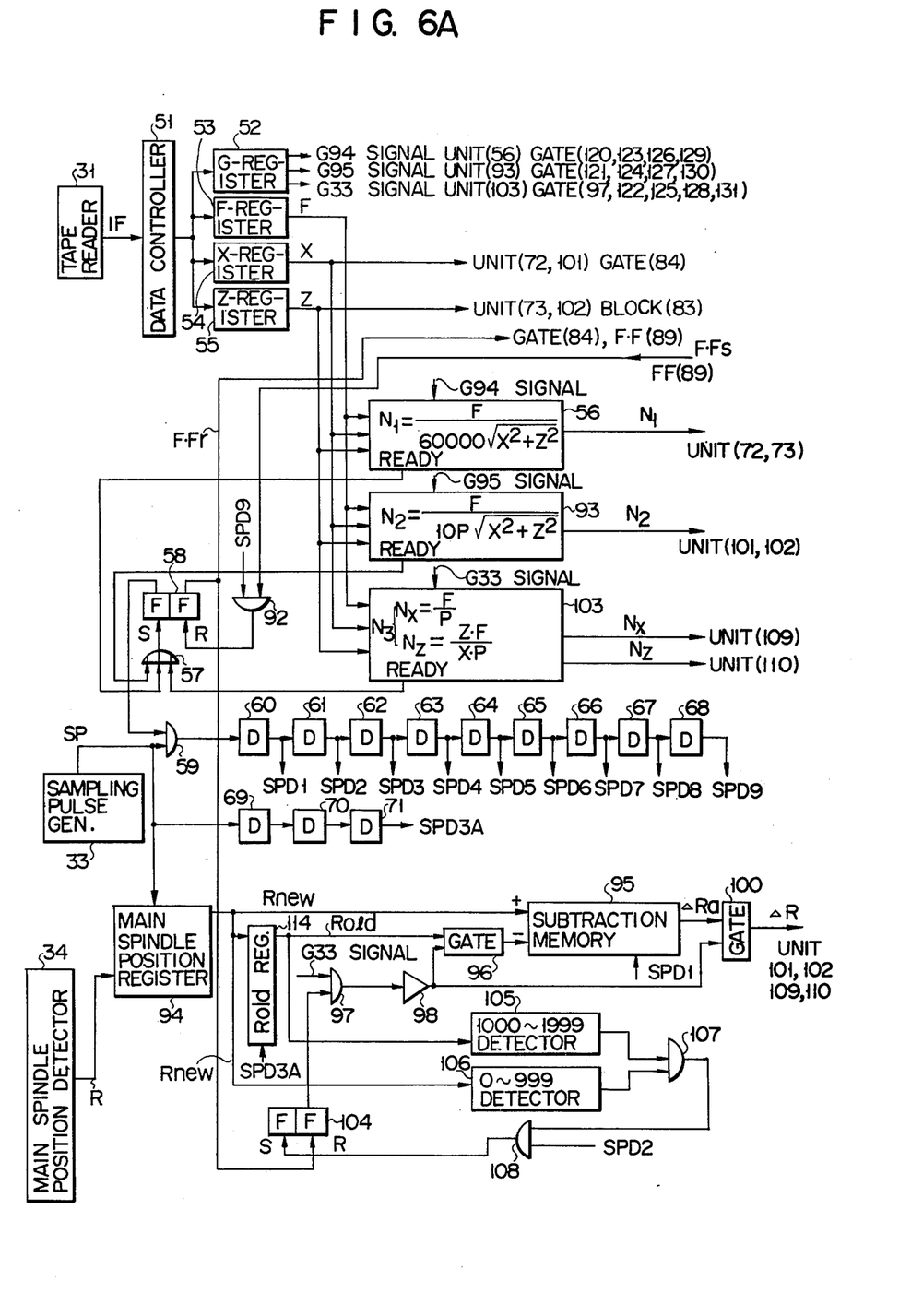
FIG. 6A is a block diagram showing the left half of the controller which constitutes a major section of the NC system and FIG. 6B is a block diagram showing a right half of the controller.
Figure 6B:
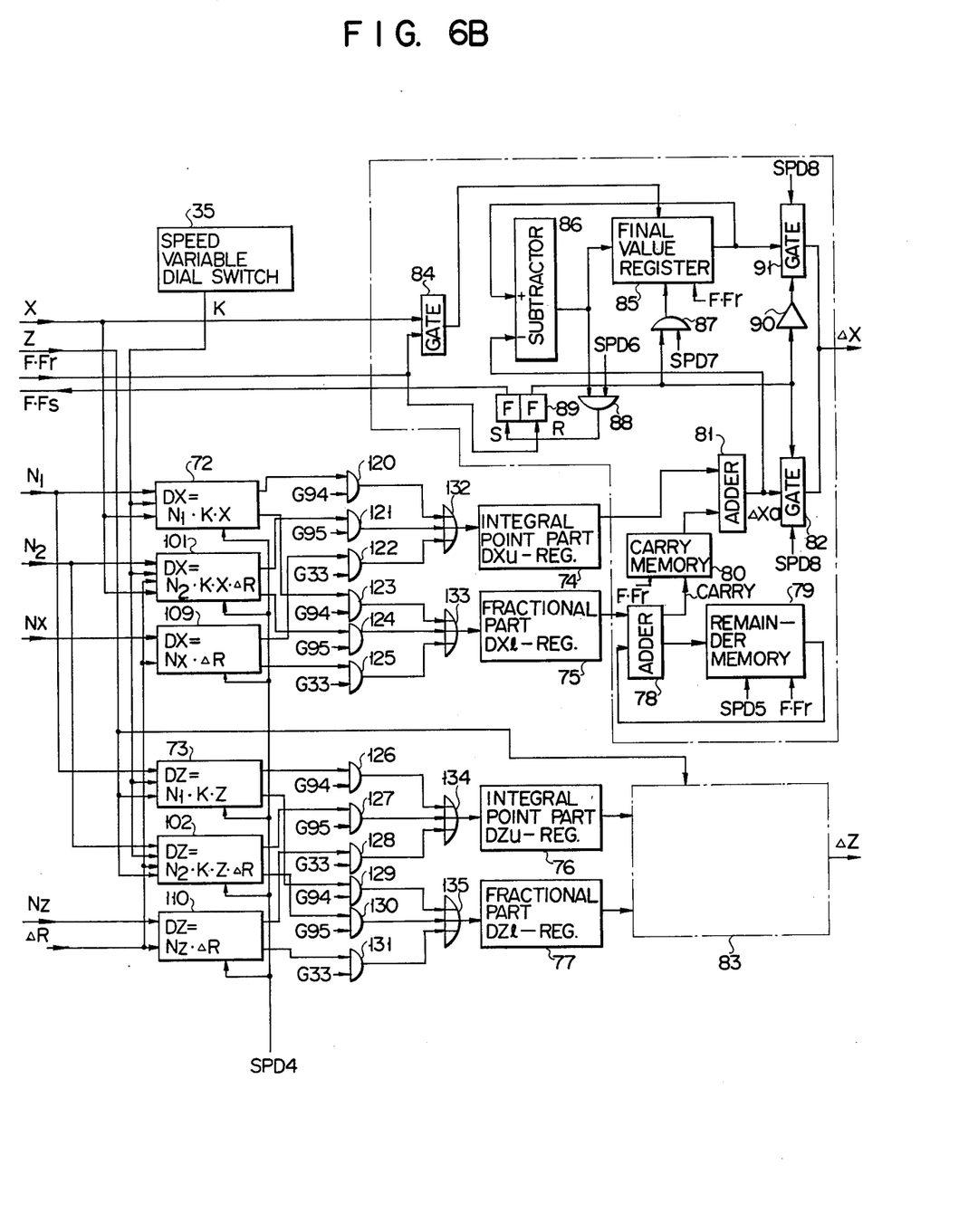

Explanation will now be made as to how the controller 32 constituting a major part of this invention calculates, during each sampling time $\Delta t$, increment values $\Delta X$ and $\Delta Z$ corresponding to the instruction position in FIG. 4. FIGS. 6A and 6B show details of the controller 32.

A. FEED PER MINUTE INSTRUCTION MODE

For the feed per minute instruction mode, the NC tape 10, in which the X- and Z-axis moving distance codes X ($\mu$m) and Z ($\mu$m), feed space instruction code F ($\mu$m/min) and prepare function code are punched in one block, is set in a tape reader 31, and a predetermined feed speed signal K is set by the feed speed variable dial switch 35. Upon depressing a start key, the tape reader 31 starts to read the NC tape 10 and the so read data IF are applied to an input controller 51 where they are decoded. The respective decoded code data are stored in predetermined registers. That is, the G94 code is stored in a G register 52, F instruction code in an F instruction register 53, X code in an X register 54 and Z code in a Z register 55. On loading of the G94 code, the G94 output terminal of the G register 52 becomes "1". These operations are indicated in a time chart in FIG. 7 (a) to (e).

When the tape reader completes the reading of the feed per minute instruction mode block 11 in the NC tape 10, an $N_1$ prepare calculating unit 56 calculates, upon a G94 signal of the G register 52 being "1", an equation $$N_1 = \frac{F}{60000\sqrt{X^2 + Z^2}}$$

based on the values F, X and Z stored in the F register 53, X register 54 and Z registers 55, respectively, and then delivers an output corresponding to a value $N_1$. The value $N_1$ is not varied until the next mode block is instructed. The calculating unit 56 can be easily constituted by a known technique. The value $N_1$ represents one calculating element of a calculating unit to be later described.

Figure 7:
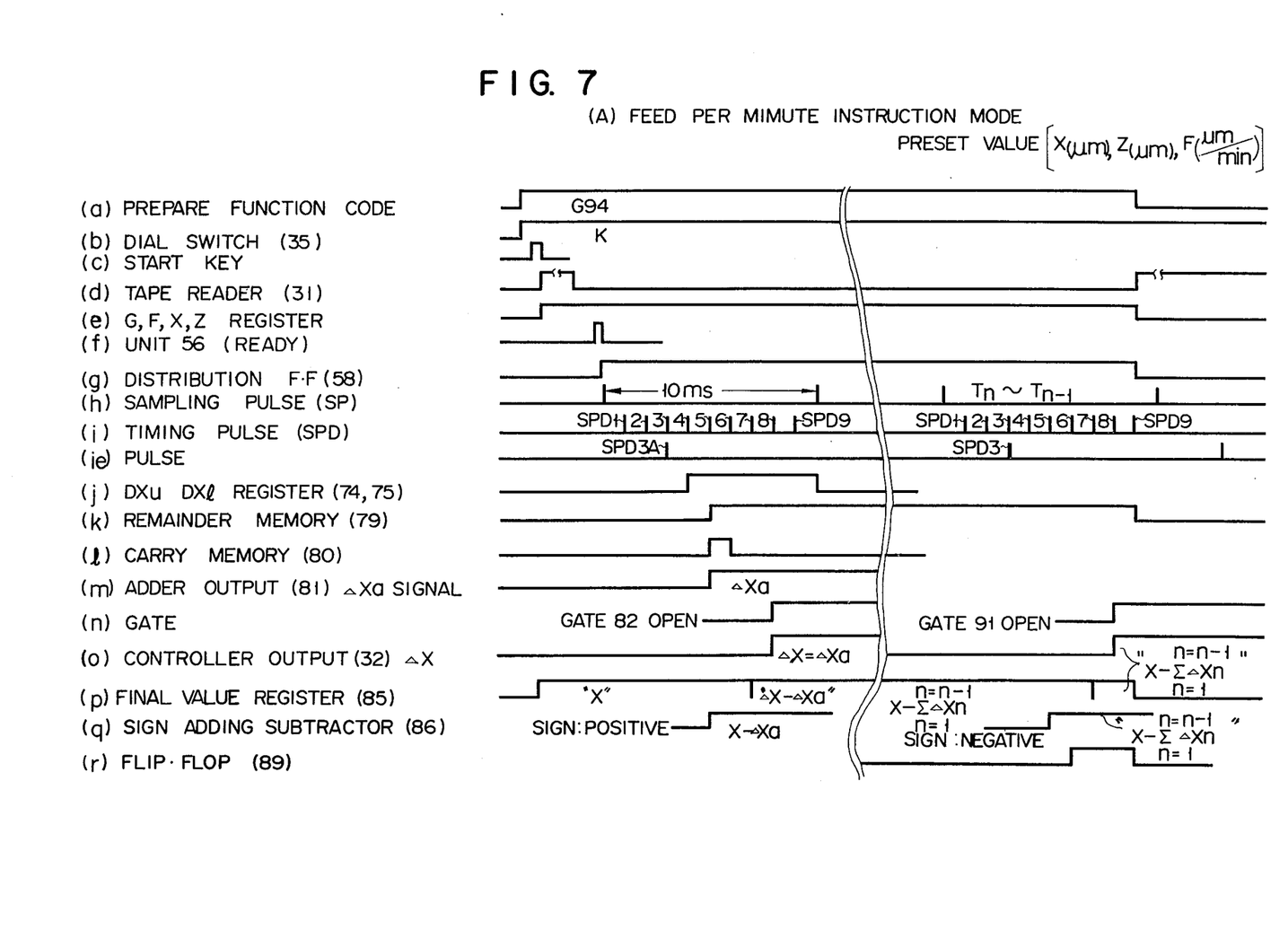
FIG. 7 is a time chart for a feed per minute instruction mode of the controller.

Suppose now that an NC system for allowing a tape instruction of a range $\sqrt{X^2+Z^2} = 1$ ($\mu$m) to $2^{24}$ ($\mu$m) with a feed speed instruction $F = 1000$ ($\mu$m/min) to 10,000,000 ($\mu$m/min) is designed. Then, the calculating unit 56 must effect a calculation of a value falling within $N_1 = (1/60 \times 2^{24})$ to 167. When the calculation of the value $N_1$ is completed, the calculating unit 56 delivers a ready signal to an OR circuit 57. The output signal of the OR circuit 57, when the previous block instruction was completed, set a flip-flop 58 which is now in the reset state as shown in FIG. 7(g). The setting of the flip-flop 58 causes a set output signal to be applied to one input terminal of an AND circuit 59. Since a sampling pulse SP is being supplied to the other input terminal of the AND circuit 59, the AND circuit 59 delivers, while the flip-flop 58 is in the set state, a sampling output pulse SP with a sampling time $\Delta t = 10$ ms as shown in FIG. 7(h). The sampling pulse SP is used as a timing signal SPD for controlling the controller 32 through a delay circuit as will be later described. A delay circuit 60 forms an SPD1 pulse, as shown in FIG. 7(i) delayed a time of 1 ms from the sampling pulse SP and a delay circuit 61 forms an SPD2 pulse delayed a time of 1 ms from the SPD1 pulse. Likewise, delay circuits 62 to 68 form SPD3, SPD4, SPD5, SPD6, SPD7, SPD8 and SPD9 pulses, respectively, with a time delay of 1 ms as shown in FIG. 7(i). The sampling pulse SP is passed through delay circuits 69, 70 and 71 to form an SPD3A pulse, as shown in FIG. 7(ie), delayed a time of 3 ms from the pulse SP. The SPD3A pulse is delivered for each sampling time irrespective of the flip-flop 58. The SPD pulse is used for effecting a timing control of the controller 32. The pulses SPD1 to SPD9 appear one by one during one sampling time $\Delta t$ upon receipt of an SP pulse after the setting of the flip-flop 58. Under the control of these pulses the increment values $\Delta X$ and $\Delta Z$ corresponding to the instruction position are calculated.

Upon receipt of each SPD4 pulse a DX calculating unit 72 calculates an equation $$DX = N_1 \cdot K \cdot X$$

where
  $N_1$: an output numerical value of the calculating unit 56
  $X$: an output numerical value of the X register 54
  $K$: an output numerical value K given by the feed speed variable dial switch 35 of the manual type
and delivers a result DX of the calculation. Likewise, a DZ calculating unit 73 calculates an equation $DZ = N_1 \cdot K \cdot Z$ upon receipt of each SPD4 pulse and delivers a result DZ of the calculation. The calculating units 72 and 73 are constructed of conventional digital multiplier circuits assembled according to well known logic design techniques and for the sake of simplification are not described in further detail.

The feed speed variable dial switch 35 operates to vary the feed speed instruction in 10% increments. That is, in the "10%" position of the dial one-tenth of the feed speed F is given and in the "100%" position of the dial a feed speed according to F instruction is given. In consequence, the output K of the dial switch 35 is so constructed as to give a numerical data 1 at the 10% position, numerical data 2 at the 20% position . . . and a numerical data 10 at the 100% position.

When the feed speed variable dial switch 35 has an output K with the tape instruction speed F ($\mu$m/min), the actual feed speed must be FXK/10. The increment values $\Delta X$ and $\Delta Z$ corresponding to the instruction position during the sampling time $\Delta t = 10$ ms will be expressed as follows:

$$\Delta X (\mu m) = F (\mu m/min) \cdot \frac{X}{\sqrt{X^2 + Z^2}} \cdot \frac{K}{10} \Delta T (min) \quad (1)$$

$$= F \cdot \frac{X}{\sqrt{X^2 + Z^2}} \cdot \frac{K}{10} \cdot \frac{1}{6000} = N_1 \cdot K \cdot X$$

$$\Delta Z (\mu m) = F (\mu m/min) \cdot \frac{Z}{\sqrt{X^2 + Z^2}} \cdot \frac{K}{10} \Delta T$$

$$= N_1 \cdot K \cdot Z \quad (2)$$

As will be understood from the equation (1) and (2) the calculated result DX of the DX calculating unit 72 is equal to the increment value $\Delta X$ corresponding to the instruction position during the sampling time $\Delta t = 10$ ms. Likewise, the calculated result DZ of the unit 73 is equal to the increment value $\Delta Z$ corresponding to the instruction position during the sampling time $\Delta t = 10$ ms. However, the calculated results DX, DZ of the calculating units 72 and 73 will become a numerical value usually below a decimal point of 1 ($\mu$m). The position error circuits 36 and 42 in FIG. 3 require position increment values $\Delta X$ and $\Delta Z$ corresponding to an integral value equal to or greater than 1 ($\mu$m). For this reason, the calculated results DX and DZ of the calculating units can not be utilized directly for the position increment values $\Delta X$ and $\Delta Z$ and, therefore, a fractional part process executing circuit as will be explained below is provided in the controller 32.

The controller 32 usually generates output increments $\Delta X$ and $\Delta Z$ of integral values corresponding to the instruction position through the fractional part process executing circuit. That is, the calculated result DX of the calculating unit is usually expressed in integral units of 1 ($\mu$m) plus a decimal fractional unit, thus dividing the calculated result DX into a numerical part above (to the left of) and below (to the right of) the decimal point. The numerical value above the decimal point is expressed as $DX_U$ and the numerical value below the decimal point as $DX_L$. For the calculated result DZ, likewise, a numerical value above the decimal point is expressed as $DZ_U$ and a numerical value below the decimal point, as a $DZ_L$. Among these numerical values, the value $DX_U$ is stored through AND gate 120 and OR gate 132 into an integral part register 74; the value $DX_L$ through AND gate 123 and OR gate 133 into a fractional part register 75; the value $DZ_U$ through AND gate 126 and OR gate 134 into an integral part register 76; and the value $DZ_L$ through AND gates 129 and OR gate 135 into the fractional part register 77. The states of the $DX_U$ and $DX_L$ are shown in FIGS. 7 (j).

Each numerical value $DX_L$ stored for each SPD4 sampling time into the fractional part register 75 is sequentially added to an adder 78. The calculating result of the adder 78 is stored in a remainder memory 79 in response to the SPD5 timing pulse as shown in FIG. 7(k) and thus each decimal cumulative value (i.e. numerical value below the decimal point) outputted for each sampling time is stored in the remainder memory 79. The decimal cumulative value stored in the remainder memory 79 and the numerical value $DX_L$ stored in the decimal part register 75 are added together. Any numerical data above the decimal point which results from the addition is stored as overflow or carry data in the carry memory 80. An adder 81 adds together the numerical value $DX_U$ stored in the integral part register 74 and the numerical data stored in the carry memory 80 to deliver a numerical integer value (i.e. a numerical value representative of only an integer), as shown in FIG. 7(m), corresponding to the instruction position.

The output of the adder 81 is outputted, as an increment value $\Delta X = \Delta XA$ corresponding to the instruction position, to the position error circuit in FIG. 3 through a gate 82 which is opened by the SPD8 pulse. As mentioned above, the calculated result DX calculated by the calculating unit 72 during each sampling time is classified into an integral value $DX_U$ and fractional value $DX_L$. The so classified fractional values $DX_L$ are cummulatively added together and when the result of the addition amounts to a value greater than unity, the overflowed value (carry) is added to the integral value $DX_U$ and in consequence the controller 32 delivers during each sampling time the increment value $\Delta X$ (an integer only) corresponding to the instruction position as shown in FIG. 7(o).

Since as mentioned-above the position instruction increment value $\Delta X$ constitutes an integer only, no logical problem is presented with respect to the NC system and the NC system effects a smooth operation. The instruction position increment value ΔX outputted during each sampling time Δt = 10 ms is applied to the position error circuit 36 in FIG. 3 and the machine movable section 38 is moved through the servo system.

When distribution flip-flop 58 (FIG. 6A) is in the reset state the contents of the X register 54 are transferred through a gate 84 into an final value register 85 as shown in FIG. 7(p). When the flip-flop 58 is in the set state as shown in FIG. 7(g) the output value ΔXA from adder 81 is subtracted at an adder/subtractor 86 from the final value X of the final value register 85 which is stored by an SPD7 pulse passing through the AND gate 87. As a result of the substraction, the value (X−ΔXA) is stored in the end value register 85. In consequence, the result obtained by subtracting the output value ΔXA of the adder 81 from the contents of the register 85 for each SPD7 puse is stored in the final value register 85.

When, however, the instruction position increment value ΔXA of the adder 81 is subtracted for each sampling time from the contents of the final value register 85, if the controller 32 delivers the instruction position increment value ΔX by a SPD8 pulse generated during the sampling time between $tn-1$ and $tn$ as shown in FIG. 4, the cumulative value (ΣΔX = ΔX1 + ΔX2 . . . + ΔXn) exceeds the value corresponding to the instruction moving distance X and the sign of the output from adder/subtractor 86 goes negative. In order to prevent erroneous operation of the system in such a situation the controller 32 includes a final processing circuit having the following logic arrangement.

When the position increment value ΔXA during the sampling time is subtracted at the adder/subtractor 86 from the contents of the final value register 85 as shown in FIG. 7(p), a final processing action during the sampling time between $tn-1$ and $tn$ is controlled in response to the sign reversal occurring at the output of subtractor 86 at the SPD5 pulse time. When the sign of the subtractor 86 output is reversed, the reversed sign signal is applied at the next SPD6 pulse time to the set terminal of a flip-flop 89 through an AND gate 88. The flip-flop 89 is set as shown in FIG. 7(r). When the flip-flop 89 is set, the AND gate 87 is not enabled at the time the SPD7 pulse is applied to the AND circuit 87, and in consequence the result of the subtraction at the subtractor 86 is not stored in the final value register 85 and the final value register stores a numerical value $$(X - \sum_{x=1}^{x=n-1} \Delta X)$$

up to the sampling time $tn-1$. Furthermore, when the flip-flop 89 is set, the gate 82 is not opened even when the SPD8 pulse is applied. During the sampling time between $tn-1$ and $tn$, therefore, the controller 32 opens at the SPD8 pulse time a gate 91, to which the reset output of the flip-flop 89 is applied through an inverter 90, and delivers an output value $$X - \sum_{x=1}^{x=n-1} \Delta X$$

through the gate 91. As a result, the instruction position increment value outputted from the controller 32 is an accurate and correct instruction value.

Still further, when the flip-flop circuit 89 is set as shown in FIG. 7(r), the set output signal of the flip-flop circuit 89 is applied to an AND circuit 92. When an SPD9 pulse is applied to the AND circuit 92, the AND circuit 92 is activated to deliver a logic "1" signal. The output signal of the AND circuit 92 is applied to the reset terminal of the flip-flop 58, causing the latter to be reset at the SPD9 time pulse. When the flip-flop 58 is reset, the flip-flop 89 is reset upon receipt of a reset output signal FFR of the flip-flop 58 as shown in FIG. 7(r). With the flip-flop 58 in the reset state, sampling pulses from sampling pulse generator 31 do not activate AND circuit 59 since the AND circuit 59 is disabled through flip-flop 58. In consequence, the SPD1 to SPD9 pulses are not generated and the calculation and distribution of the instruction position increment values ΔX is interrupted and the G-, F-, X- and Z registers 52, 53, 54 and 55 together with the final value register 85 and remaining memory 79 are cleared as shown in FIGS. 7(e), (k) and (p).

Although the above-explanation is restricted to the X-axis direction, the calculation and distribution of the instruction position increment value ΔZ for each sampling time Δt = 10 ms with respect to the Z axis can be likewise effected. Although the position increment value ΔZ in the Z-axis for the sampling time Δt = 10 ms is classified into the integral part $DZ_U$ and the fractional part $DZ_L$ as mentioned above, the fractional process action, as well as the final process action during the sampling time between $tn-1$ and $tn$ as shown in FIG. 4, is executed by circuits 83 (FIG. 6B) operating in the same fashion as the circuits shown within the upper dot-dash line in FIG. 6B. The circuit block 83 delivers for each sampling time an accurate Z-axis increment value corresponding to the instruction position. In this way, X- and Z-axis increment values ΔX and ΔZ corresponding to the instruction position are applied to the position error circuits 36 and 42 in FIG. 3, respectively, thereby operating the servo system.

When the flip-flop 58 is reset to cause the SPD pulse to cease to exist and the controller 32 ceases to distribute the instruction position increment values ΔX and ΔZ, the tape reader 31 reads the next instruction block 12 on the NC tape 10.

Explanation will now be made of the case where the instruction block is the feed per revolution instruction mode.

B. FEED PER SPINDLE REVOLUTION INSTRUCTION MODE:

The instruction for cutting the workpiece on the straight line of X (μm) and Z (μm) in FIG. 4 and based on the feed per spindle revolution instruction F (μm/rev) is punched on the NC tape 10. As already explained in connection with FIG. 1 the G95 code is punched as the prepare function code in the NC tape 10. When the NC tape 10 is read by the tape reader 31, given data IF is supplied to the data controller 51 where the G95 code is stored in the G register 52, F instruction code in the F register 53, X data in the X register 54 and Z data in the Z register 55. In consequence, the G95 terminal of the G register 52 becomes a logic "1".

When the G95 signal is "1" after the necessary data is read by the tape reader 31 from the NC tape 10, the $N_2$ calculating unit 93 is activated and calculates an equation $$N_2 = \frac{F}{10p \sqrt{X^2 + Z^2}}$$

and delivers an output value $N_2$. The output value $N_2$ is not varied until the next instruction mode. p in the equation $$N_2 = \frac{F}{10p \sqrt{X^2 + Z^2}}$$

represents a divided value of the spindle position detector and with one embodiment according to this invention $p = $ a predetermined value of 2000.

Figure 8:
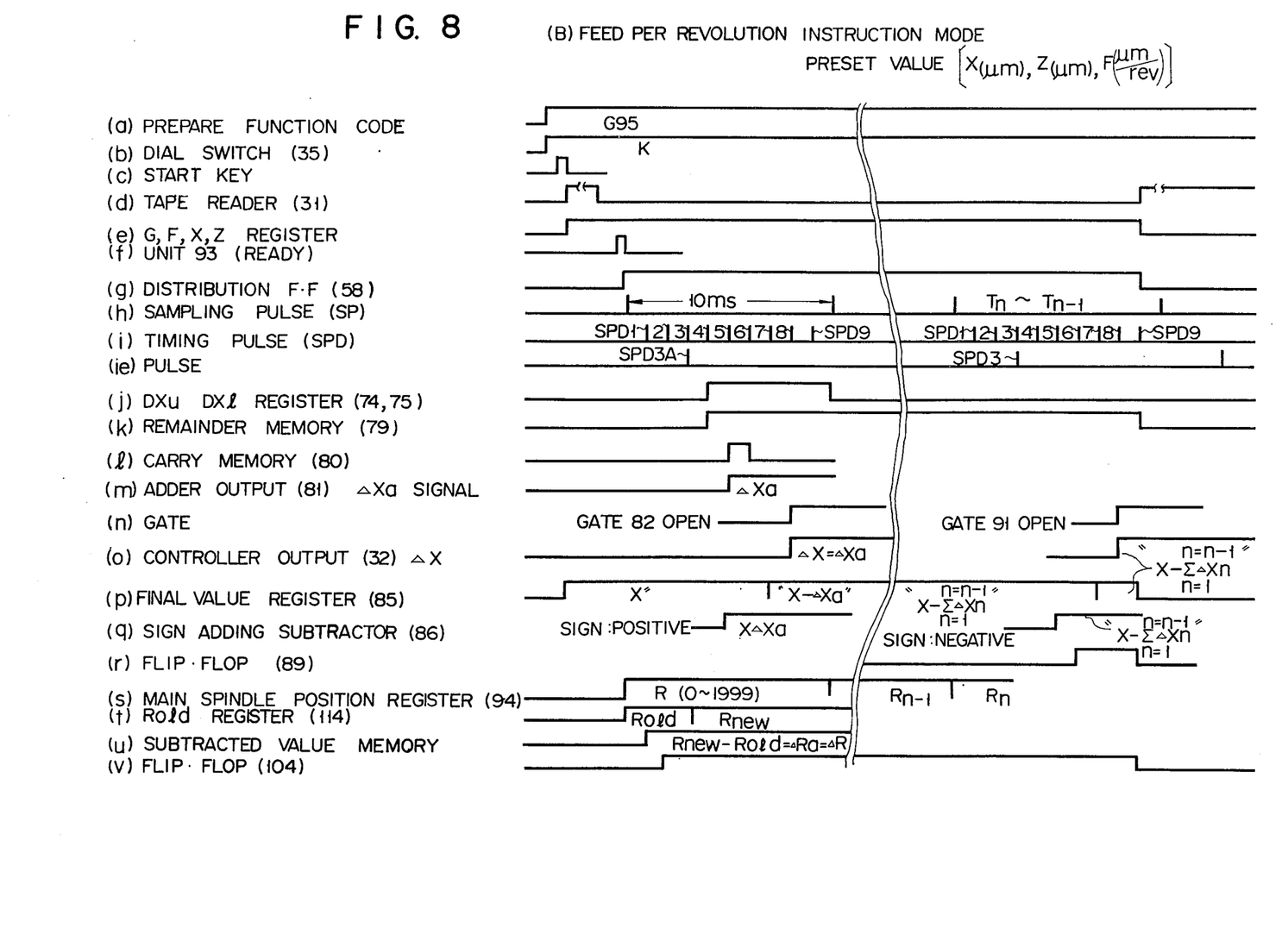
FIG. 8 is a time chart for a feed per revolution instruction mode of the controller.

In order to design an NC system for allowing a tape instructin of a range of $\sqrt{X^2+Z^2} = 1$ ($\mu$m) to $2^{24}$ ($\mu$m) with $F = 1$ ($\mu$m/rev) to 1,000,000 ($\mu$m/rev), it is required that the $N_2$ calculating unit 93 calculate a value of $N_2 = 1/(20000 \times 2^{24})$ to 50 to deliver an output. When the calculation of a numerical value $N_2$ is completed, the $N_2$ calculating unit 93 delivers a ready signal to the OR circuit 57. The ready signal of the OR circuit 57 sets the distributing flip-flop 58, causing SPD1 to SPD9 pulses to be delivered from the delay circuits 60 to 68. An SPD3A pulse is delivered from a delay circuit 71. These relations are shown in FIG. 8. The spindle position detector 34 in FIG. 6A uses a position coder for an absolute position obtained by dividing one revolution of the spindle into units $p = 2000$. The spindle position detector 34 delivers an output corresponding to a digital amount R ($R = 0$ to 1999) when the spindle is rotated from one reference position to a position corresponding to R/P (R/P is within one complete revolution). When the spindle makes more than two revolutions, the spindle position detector 34 delivers an output of $R = 0$ to 1999 in a cyclic fashion. By the SP pulse generated for each sampling time from the sampling pulse generator 33 a spindle position information R at the time the SP pulse is delivered from the detector 34, and is stored as shown in FIG. 8(s) into the spindle position register 94. The content (R new) of the spindle position register 94 is not varied until the next SP pulse. The subtraction memory 95 subtracts the output data of the gate 96 from the R new data at the time the SPD1 pulse is applied and the result is stored in the subtraction memory 95 as shown in FIG. 8(u).

Since the G33 signal of the G register 52 is "0", the AND circuit 97 is not ANDed and the inverter 98 delivers an output "1". In consequence, the R old data in an R old register 114 appears from the gate 96. The subtraction memory 95 subtracts the R old data from the spindle position R new data at the time of a sampling pulse SP stored in the spindle register 94 at the SPD1 pulse time as shown in FIG. 8(u). As a result of the subtraction, a data signal $\Delta$RA is delivered through a gate 100 to the next stage calculating unit. That is, the spindle position detector 34 makes a division of 0 to 1999 units with respect to the spindle position when the spindle is within one complete rotation, but when the spindle make more than one complete rotation, the spindle position detector 34 delivers a cyclic output. When the result of subtraction becomes a minus value after the return of the spindle to a zero position (i.e. after one complete rotation) a + 2000 was added to the result of subtraction. The subtraction memory 95 is so controlled as to represent an amount of spindle revolution, during the sampling time $\Delta t$, always in terms of a positive numerical value. Then, the content R new data of the spindle position register 94 is stored in the R old register as shown in FIG. 8(t) upon arrival of the SPD3A pulse. The R new data of the register 94 is used as an R old data during the next sampling time. As mentioned above, the spindle position date $\Delta$R outputted by the gate 100 is applied to DX and DZ calculating units 101 and 102. The DX calculating unit 101 calculates a value of $DX = N_2 \cdot K \cdot X \cdot \Delta R$, for each SPD4 pulse, on the basis of the output $N_2$ of the $N_2$ calculating unit 93, data X from the X-register 54, value K set by the feed speed variable dial switch 35 and spindle position data $\Delta$R, and delivers an output DX. Likewise, the DZ calculating unit 102 calculates a value of $DZ = N_2 \cdot K \cdot Z \cdot \Delta R$ and delivers an output DZ.

Suppose that the dial switch 35 is set to 10% with a tape speed instruction ($\mu$m/rev) and the spindle is rotated, through an angle of ($\Delta$R/P) (rev), during the sampling time $\Delta t = 10$ ms. Then, the instruction position increment values $\Delta$X and $\Delta$Z will be given below:

$$\Delta X (\mu m) = F (\mu m/rev) \cdot \frac{X}{\sqrt{X^2 + Z^2}} \cdot \frac{K}{10} \cdot \frac{\Delta R}{P} (rev)$$

(3)

$$= N_2 \cdot K \cdot X \cdot \Delta R$$

$$\Delta Z (\mu m) = F (\mu m/rev) \cdot \frac{Z}{\sqrt{X^2 + Z^2}} \cdot \frac{K}{10} \cdot \frac{\Delta R}{P} (rev)$$

(4)

$$= N_2 \cdot K \cdot Z \cdot \Delta R$$

In consequence, the calculated results DX and DZ of the DX and DZ calculating units 101 and 102 represent the instruction position increment values $\Delta$X and $\Delta$Z during the sampling time $\Delta t = 10$ ms. The increment values DX and DZ include decimal fraction include a value. For the value DX, $DX_U$ represents a numerical value above (to the left of) the decimal point and $DX_L$, a numerical value below (to the right of) the decimal point and, for the value DZ, $DZ_U$ represents a numerical value above the decimal point and $DZ_L$, a numerical value below the decimal point, the values DX and DZ being based on the unit 1 ($\mu$m). The value $DX_U$ is stored in the integral part register 74; the value $DX_L$, in the fractional part register 75; the value $DZ_U$, in the integral part register 76; and the value $DZ_L$, in the fractional part register 77. The subsequent decimal action and final processing action are executed as in the case of the feed per minute instruction mode previously described in section (A) and the NC system performs a cutting operation on the feed speed F ($\mu$m/rev) linear instruction.

Explanation will now be made of the case where the NC system performs a thread cutting operation.

C. THREAD CUTTING INSTRUCTION MODE

When a taper thread of X ($\mu$m), Z ($\mu$m) in FIG. 4 is to be cut, if $|X| > |Z|$ as shown in FIG. 4, the X-axis thread pitch is so controlled as to agree with the pitch instruction F ($\mu$m/rev). For $|X| < Z$, the Z-axis thread pitch is so controlled as to agree with the pitch instruction F ($\mu$m/rev).

Explanation will be hereinafter made as to the case of $|X| > |Z|$. Note that, for $|X| < Z$, the calculation will be made by replacement as compared with $|X| > |Z|$.

The X, Z, F (μm/rev) data and G33 code are punched in one block in the NC tape 10. When the tape reader 31 reads the thread cutting instruction mode block 13 on the NC tape 10, a data signal IF is distributed through the data controller 51. That is, an X data is stored in the X register 54; a Z data, in the Z register 55; an F instruction, in the F register 53 and a G33 code, in the G register 52. In consequence, only the G33 signal output terminal of the G register 52 becomes "1".

When the G33 signal is "1", the $N_3$ preliminary computing unit 103 calculates $NX = (F/P)$ and $NZ = (Z/X)\cdot(F/P)$ and delivers calculated outputs NX and NZ. The values NX and NZ are not varied until the next tape instruction block. In order to allow a tape instruction of $X = Z = 1$ (μm) to $2^{24}$ (μm) with F = 0 1 (μm/rev) to 1,000,000 (μm/rev), it is required that the $N_3$ calculating unit 103 deliver output values $NX = (1/2000)$ to 500 and $NZ = (1/2000 \times 2^{24})$ to 500. When the $N_3$ calculating unit 103 completes the calculation of the values NX and NZ, it delivers a ready signal to the OR circuit 57 as shown in FIG. 8(f). Upon the application of the ready signal the distribution flip-flop 58 is set as shown in FIG. 8(g) and timing pulses SPD1 to SPD9 and SPD3A are generated.

For the thread cutting, it is required that increment values ΔX and ΔZ corresponding to the instruction position for each 10 ms. sampling interval Δt be calculated in synchronism with the reference position of the spindle. The NC system includes a logic circuit adapted to judge a spindle reference position and be made in synchronism with the reference position. A flip-flop 104 for defining the spindle reference position is adapted to be reset only when the distribution flip-flop 58 is in the reset state. When the flip-flop 104 is in the reset state, an AND circuit 97 is activated upon receipt of a G33 signal and in consequence the outputs of the gates 96 and 100 become zero through an inverter 98 and the instruction position increment values ΔX and ΔZ become zero. The above-mentioned operative state continues even after the flip-flop 58 is set. A 1000 to 1999 detector 105 delivers a detection signal "1" only when the content (R old data) of the register 114 shows a numerical value 1000 to 1999. Likewise, a 0 to 999 detector 106 delivers a detection signal "1" only when the content (R new data) of the spindle position register 94 shows a numerical value 0 to 999. Suppose that the distribution flip-flop 58 is set. Then, the instruction position increment values ΔX and ΔZ of the controller 32 remain zero until after the spindle reaches the reference position during one revolution of the spindle.

Figure 9:
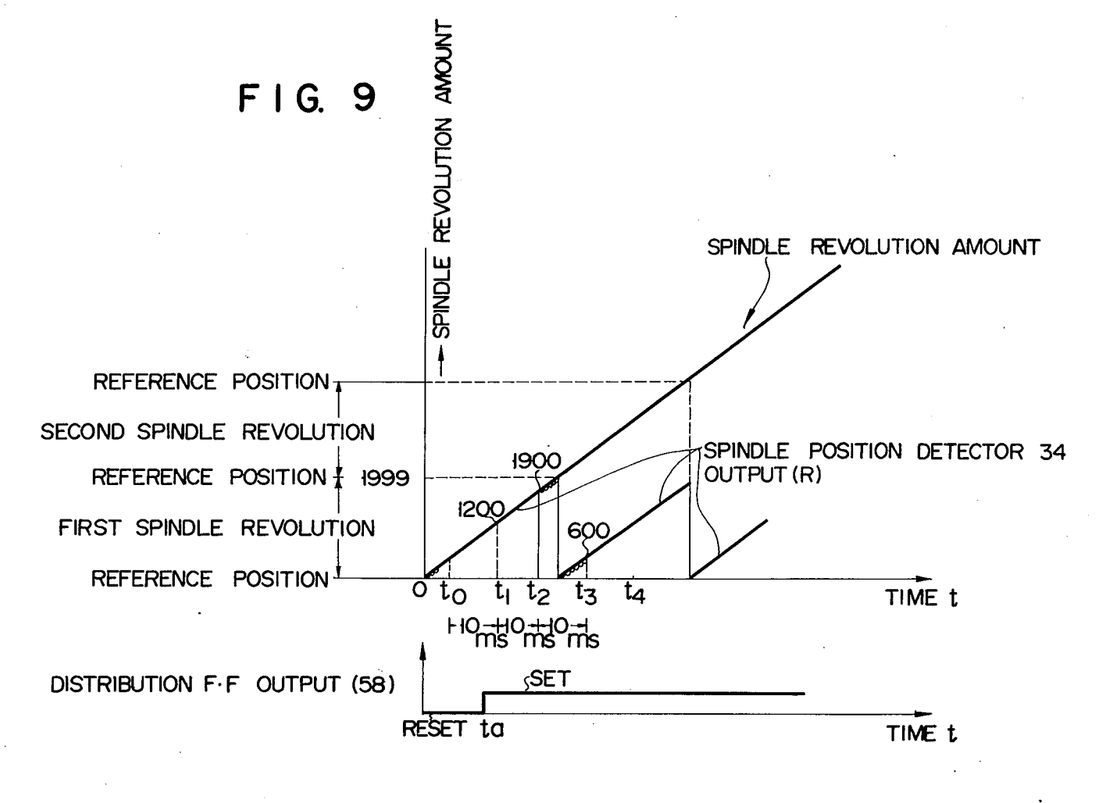
FIG. 9 is a view showing a shread cutting instruction mode of the controller.

FIG. 9 is an explanatory view showing the above-mentioned operation. With the flip-flop 58 in the reset state no timing pulses SPD1 to SPD9 appear and the instruction position increment values ΔX and ΔZ are not outputted from the controller 32. When the flip-flop 58 is set at time ta as shown in FIG. 9, if the content R new of the spindle position register 94 shows a numerical value of, for example, 1200 at the first sampling time t1 after the lapse of time ta, the 0 to 999 detector 106 applies a detection signal "0" to an AND circuit 107. Since the output of the AND circuit 107 is zero, the AND circuit 108 is not activated and the flip-flop 104 remains in the reset state. In consequence, the output of the inverter 98 becomes zero and, since the gate 100 is not opened, the spindle revolution position data ΔR from the gate 100 becomes zero. At the sampling time Δt between t1 to t2 the instruction position increment values ΔX and ΔZ from the controller 32 are "0".

If at the sampling time t2 the content R new of the spindle position register 94 is, for example, a numerical value of 1900, no detection is effected at the detector 106. During the sampling time between t2 and t3 the position increment values ΔX and ΔZ from the controller 32 remains zero. The content R new = 1900 of the spindle position register 94 is stored in the R old register 114 upon receipt of an SPD3A pulse generated during the sampling time t2 and t3. When the spindle passes through the reference position and at the sampling time t3 the contents of the spindle position register 94 shows, for example, 600, the detector 105 detects a value 1900 stored in the R old register 114 and delivers a detection output "1". The detector 106 detects the value 600 stored in the spindle position register 94 and delivers a detection signal "1".

In consequence, the AND circuit 107 is activated to deliver an output "1" to an AND circuit 108. The AND circuit 108 supplies an output "1" to the set terminal of the flip-flop 104 at the SPD2 pulse time to come cause the latter to be set. Since, however, the flip-flop 104 remains reset at the SPD1 pulse which is 1 ms earlier than the SPD2 pulse time, the output of the gate 96 is in the "0" state at SPD1 pulse and the content ΔRA subtracted at the subtraction memory 95 upon receipt of the SPD1 pulse is R new = 600.

At the SPD2 pulse time the gate 100 is opened and the value R new = 600 is outputted as the gate output ΔR. The gate output ΔR = 600 is used in the next calculating units 109 and 110. This means that the spindle reference position is corrected by the difference between the spindle reference position and the spindle position at the time when thread cutting is actually effected with respect to the workpiece. In this way, the initial spindle revolution position data ΔRA in the thread cutting mode represents the difference between the spindle reference position and the spindle position at the present sampling time. By using the data ΔRA in the distribution calculation of the instruction position increment value ΔX and ΔZ, the increment values ΔX and ΔZ are distributed completely in synchronism with the spindle reference position.

At the sampling time between t3 and t4 (FIG. 9) the subtraction memory 95 calculates the spindle revolution reference position data ΔRA from the spindle reference position to the spindle revolution position at the sampling time t3 upon receipt of the SPD1 pulse generated at the sampling time t3. The spindle reference position flip-flop 104 is set upon receipt of the SPD2 pulse to cause the gates 96 and 100 to be opened. After $t_4$ of FIG. 9, the output of the gate 96 is transferred as an R old data from the R old register 114 and the output of the gate 100 is transferred as an output ΔR from the memory 95. Then, the controller 32 performs the same operation as described above in section (B) for the feed per revolution instruction mode.

That is, in the controller 32 shown in FIGS. 6A and 6B a preliminary calculation unit 109 for the thread cutting instruction mode calculates an equation DX = NX·ΔR for each SPD4 pulse using the value NX calculated at the N3 calculation unit 103 and the spindle revolution position data ΔR from the gate 100, and delivers an output DX. Likewise, a calculation unit 110 calculates an equation DZ = NZ·ΔR using the value NZ and spindle revolution position data ΔR, and delivers an output DZ. When in the taper thread pitch instruction F (μm/rev) the spindle rotates during the sampling time Δt through an angle of (ΔR/P) (rev), the instruction position increment values ΔX and ΔZ during the sampling time Δt will be given below. (Note that for the thread cutting mode the dial switch 35 is fixed based on the pitch instruction F and the pitch instruction F is not subjected to an influence of a value K).

$$\Delta X \, (\mu m) = F \, (\mu m/\text{rev}) \cdot \frac{\Delta R}{P} \, (\text{rev}) = NX \cdot \Delta R$$

$$\Delta Z \, (\mu m) = \frac{Z}{X} \cdot F \, (\mu m/\text{rev}) \cdot \frac{\Delta R}{P} \, (\text{rev}) = NZ \cdot \Delta R$$

That is, the calculated results DX and DZ of the calculating units 109 and 110 represent the instruction position increment values ΔX and ΔZ during the sampling time Δt = 10 ms. These calculated results DX and DZ are numerical values usually including a decimal fraction amount. For this reason the same processing as in the (A) feed per minute instruction mode is effected. As a result of calculation, the value DX is classified into an integral part $DX_U$ and fractional part $DX_L$ which are respectively stored in the registers 74 and 75. Likewise, the value DZ is classified into an integral value $DZ_U$ and fractional part $DZ_L$ which are respectively stored in the registers 76 and 77. The numerical data stored in the registers 74, 75, 76 and 77 are processed in the same way as in the (A) feed per minute instruction mode described above. The controller 32 distributes for each sampling time Δt the instruction position increment values ΔX and ΔZ for effecting a taper thread cutting based on the thread pitch instruction F (μm/rev). The increment values ΔX and ΔZ are applied to a servo system in the NC system in FIG. 3 and the machine movable section is moved based on the increment values ΔX and ΔZ so as to cut a thread in the workpiece.

While the preliminary calculating circuits 56, 93, and 103 have not been described in detail herein, their construction will be readily apparent to one familiar with digital logic circuit design. The mathematical equations illustrated for each of the circuits will readily enable the assemblage of the necessary standard calculating circuits to perform the desired mathematical operations. The same is true for the DX and DZ calculating circuits 72, 73, 101, 102, 109, and 110.

In the NC system in FIG. 3 a general-purpose computer can be used instead of the controller 32. In order to effect the functional operation of the controller 32 by the computer, a program for executing a predetermined operation is prepared. The program is stored in the computer and then the NC tape 10 is read by the tape reader 31. An output signal K of the feed speed variable switch 35, a sampling pulse SP generated from the sampling pulse generator and a spindle position detection data R detected at the spindle position detector 34 are inputted into the computer. The computer effects an arithmetic calculation based on the predetermined program using an input data from the reader 31 and control data from the above-mentioned respective devices and delivers instruction position increment values ΔX and ΔZ which in turn are applied to the corresponding position error circuits 36 and 42. The outputs of the position error circuits 36 and 42 are applied to the X- and Z-axis servo systems so as to move the machine movable section based on the respective instruction modes. The calculation process of the position error circuits 36 and 42 can be effected using the computer. If, therefore, a program is so formed as to effect a cumulative addition using a program for cumulatively adding the instruction position increment values ΔX and ΔZ for each sampling time and subtract from the cumulatively added values ΔX and ΔZ the digital signals XF and ZF, respectively, of the position detectors 37 and 46 which are inputted into the computer, the corresponding position error signals PEX and PEZ are outputted from the computer. By applying the position error signals PEX and PEZ to the X- and Z-axis servo systems the machine movable section is moved.

Explanation will now be made of another embodiment of this invention.

This NC system is adapted to detect the rotation position of the spindle using a pulse generator-equipped spindle position detector. In this case, the pulse generator is mechanically mounted on the spindle. The pulse generator delivers one pulse from its first output terminal each time the spindle is rotated through an angle of (1/P) and the first output pulse counts the first output pulse by a counter with a capacity P. When the pulse generator confronts any one reference position on the spindle during one rotation of the spindle, the pulse generator delivers one reference pulse from its second output terminal. By this reference pulse the content of the counter is made "zero" and the counter is adapted to count the present position on the spindle which is moved from the reference position on the spindle. The output of the counter is applied to the spindle position register in FIG. 5.

In the first embodiment, for example, the numerical values $$N1 = \frac{1}{60 \times 2^{24}} \text{ to } 167, \, N2 = \frac{1}{20{,}000 \times 2^{24}} \text{ to } 50,$$

calculated at the N1 and N2 prepare calculating units become greater in their data digit. Since the numerical data DX and DZ calculated for each sampling time Δt = 10 ms involves multi-digit figures, the calculating time of the calculating unit becomes longer. In consequence, the effective values of the numerical values N1 and N2 are converted to a floating point data reduced down to an accuracy required for the NC system. If, for example, N1 = 0.00011 is reduced to a data form 1 × 10$^{-4}$, the values DX and DZ can be rapidly calculated as compared with the case of the first embodiment. In this case, however, the calculating results DX and DZ calculated at the calculating unit must be reduced to fixed point equivalents when they are distributed into the values $DX_U$ and $DX_L$ and $DZ_U$ and $DZ_L$.

Figure 5:
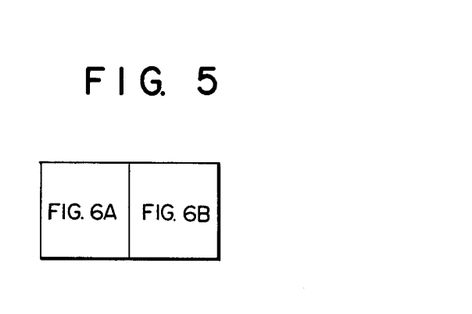
FIG. 5 is a combination drawing of FIGS. 6A and 6B.

With this NC system, equations $$NX_1 = \frac{F}{6000 \sqrt{X^2 + Z^2}} \cdot X$$

and $$NZ_1 = \frac{F}{60000 \sqrt{X^2 + Z^2}} \cdot Z$$

can be calculated at the calculating unit 56 in FIG. 5; an equation $DX = NX_1 \cdot K$ can be calculated at the DX calculating unit 72; and an equation $DZ = NZ_1 \cdot K$ can be calculated at the DZ calculating unit 73. By so doing, the calculating time of the ΔX and ΔZ during each sampling time Δt = 10 ms can be quickened. Furthermore, equations $$NX_2 = \frac{F}{10P\sqrt{X^2 + Z^2}} \cdot X \text{ and } NZ_2 = \frac{F}{10P\sqrt{X^2 + Z^2}} \cdot Z$$

can be calculated at the $N_2$ prepare calculating unit; an equation $DX = NX_2 \cdot K \cdot \Delta R$ can be calculated at the DX calculating unit; and an equation $DZ = NZ_2 \cdot K \cdot \Delta R$ can be calculated at the DZ calculating unit. By so doing, the calculating time of the numerical values DX and DZ can be quickened.

This invention is not restricted to the above-mentioned embodiments and various modifications can be made without departing from the spirit and scope of this invention.

What is claimed is:

1. A numerical control system for lathes, comprising a numerical data source for providing numerical instruction data defining a feed per minute instruction mode, feed per spindle revolution instruction mode and a thread cutting instruction mode; a sampling pulse generator for generating a sampling pulse for each predetermined time $\Delta t$; a spindle position detector mechanically mounted on a spindle of the lathe, dividing one rotation of the spindle and delivering an output corresponding to any divided position on the spindle as a cyclic function from a spindle reference position; and a controller adapted to calculate, in said feed per minute instruction mode, instruction position increment values corresponding to a tool moving amount for each said predetermined time on the basis of said numerical data, to calculate, in said feed per revolution instruction mode, instruction position increment values corresponding to a tool moving amount for said predetermined time on the basis of said numerical data and an amount of spindle rotation detected for each said predetermined time at said spindle position detector and to calculate, in said thread cutting instruction mode, instruction position increment values corresponding to a tool moving amount for each predetermined time on the basis of said numerical data and spindle revolution position data from a spindle reference position detected for each said predetermined time at said spindle position detector.

2. The numerical control system according to claim 1, in which said controller includes a fractional value processing circuit adapted to classify said instruction increment values into an integral part above a decimal point and a fractional part below a decimal point with a unit as a reference, cumulatively add said fractional values foreach said predetermined time $\Delta t$ to deliver a carry for addition to the integral part, and deliver an output corresponding to the instruction position increment values of an integer only for each said predetermined time.

3. The numerical control system according to claim 1, in which said controller includes circuit means comprising a logic circuit adapted to detect whether or not a cumulative value of said instruction position increment values exceeds a value corresponding to a predetermined tool moving distance and to deliver as an output when said cumulative value exceeds said predetermined distance a final position increment value corresponding to the difference between said predetermined tool moving distance and a value representing said cumulative value less the last preceding position increment value.

4. The numerical control system according to claim 1 in which said controller includes logic circuit means adapted to judge in said thread cutting instruction mode a spindle reference position from the cyclic spindle position data detected at said spindle position detector and deliver an output corresponding to a spindle revolution position which is made in synchronism with said reference position.

5. The numerical control system according to claim 1, further including a position detector for detecting an absolute position of a machine movable section equipped with a tool and a position error circuit adapted to cumulatively add said instruction position increment values and deliver a position error output signal by taking a difference between the cumulative value and the output from said position detector.

6. A numerical control system for lathes, comprising a numerical data source for providing numerical instruction data defining a feed per minute instruction mode, feed per revolution instruction mode and thread cutting instruction mode; a sampling pulse generator for generating a sampling pulse for each predetermined time $\Delta t$; a spindle position detector mechanically mounted on a spindle of the lathe, dividing one revolution of the spindle and delivering an output in a cyclic function from a spindle reference position; and a controller adapted to calculate for each said predetermined time instruction position increment values corresponding to a tool moving amount for said each predetermined time upon receipt of data from said numerical data source, sampling pulse generator and spindle position detector.

7. The numerical control system according to claim 6, in which said controller performs (A) a fractional part processing action by classifying instruction position increment values calculated for each said predetermined time into an integral part above a decimal point and a fractional part below a decimal point with a unit as a reference, cumulatively adding the fractional values for each said predetermined time to deliver a carry for addition to said integral part and delivering instruction position increment values of an integer only for each said predetermined time, (B) a final processing action by determining whether or not a cumulative value of the instruction position increment values of an integer only for each said predetermined time exceeds a value corresponding to a tool moving distance and delivering, as an output when said cumulative value exceeds said value representing said predetermined distance a final position increment value corresponding to the difference between said predetermined moving distance and a value representing said cumulative value less the last preceding position increment value, and (C) a processing action by determining a spindle reference position from a cyclic spindle position data value detected at said spindle position detector.

8. The numerical control system according to claim 6, in which said controller is adapted to cumulatively add instruction position increment values calculated for each said predetermined time and deliver a position error data by obtaining a difference between a cumulative value and a detection output detected at a position detector for detecting an absolute position of a machine movable section.

9. In a numerical control system for controlling the movement of a machine tool element along a predetermined feed axis, the combination comprising:

a drive servo for moving said element along said feed axis, said servo including a position detector for generating a position signal representing the actual position of said machine tool element, a position error circuit for generating an error signal in response to said position signal and a command signal representing the desired position of said element, and a servo motor for driving said element in response to the output of said position error circuit;

means for supplying a coded instruction signal including data representing an amount of feed movement and a feed speed; and controller means for generating said command signal in response to said coded instruction signal, said controller means including:

a sampling pulse generator for generating sampling pulses $t$ for each of a series of predetermined time intervals;

means responsive to said amount of feed movement and feed speed data and to said sampling pulses for generating a sequence of incremental movement command signal DX, said DX signals including an integral value portion and a fractional value portion;

cumulating means, having an input and an output, constructed and arranged to accumulate the values of successive signals presented at said input, the output of said cumulating means representing said command signal and being supplied to said position error circuit;

gating means for gating the integral value portion of said DX signal to the input of said cumulating means in response to each sampling pulse;

adding and memory means for accumulating the fractional value portion of said DX signals in response to each sampling pulse and for storing the cumulative total thus produced; and carry means responsive to said adding and memory means for increasing the value of said integral value portion of said DX signal gated to said cumulating means each time the cumulative total of the fractional value portion of said DX signal reaches unit.

* * * * *

UNITED STATES PATENT OFFICE
CERTIFICATE OF CORRECTION

Patent No. 4,053,819          Dated October 11, 1977

Inventor(s) Mitsuo Matsumoto

It is certified that error appears in the above-identified patent and that said Letters Patent are hereby corrected as shown below:

Column 19,     line 16,     change "t" to -- Δt --.

Signed and Sealed this

Twenty-eighth Day of February 1978

[SEAL]

Attest:

RUTH C. MASON
*Attesting Officer*

LUTRELLE F. PARKER
*Acting Commissioner of Patents and Trademarks*